United States Patent [19]

Culley

[11] Patent Number: 5,058,005
[45] Date of Patent: Oct. 15, 1991

[54] COMPUTER SYSTEM WITH HIGH SPEED DATA TRANSFER CAPABILITIES

[75] Inventor: Paul R. Culley, Cypress, Tex.

[73] Assignee: Compaq Computer Corporation, Houston, Tex.

[21] Appl. No.: 243,480

[22] Filed: Sep. 9, 1988

[51] Int. Cl.$^5$ ............................................. G06F 13/00
[52] U.S. Cl. .................................... 364/200; 364/244; 364/246; 364/246.3; 364/254; 364/254.3
[58] Field of Search ... 364/200 MS File, 900 MS File

[56] References Cited

U.S. PATENT DOCUMENTS 4,839,856  6/1989  Tanaka ................................ 364/900
4,924,375  5/1990  Fung et al. ......................... 364/200

OTHER PUBLICATIONS

H. Jessup, PCET 32-Bit Bus Specification, PCET Bus Development Committee, Jun. 9, 1986.
M. Vano, Personal Computer Extended Technology Bus Commmittee Alternate Bus Master Data Multiplexing Draft Subcommittee Report, 6/14/86.
M. Vano, Ambiguities in the IBM PC/RT and PC/AT Documentation (RE: Alternate Bus Masters), Jun. 15, 1986.
M. Fung, Extending at Bus Bandwidth, Chips and Technologies, May 21, 1986.
PCET Standards Committee, Proposal for a Burst Mode, 1986.
82C302 Page/Interleave Memory Controller, pp. 43-68 Chips and Technologies.
Intel Memory Design Handbook, pp. 3-1-3-13, Intel Corporation 1977.
IEEE, P1196 Specification-NuBus, Dec. 15, 1986, pp. 1-59.
IBM Corp., Personal Computer AT Technical Reference, First Edition, Sep. 1985, pp. 1-24 to 1-38.
IBM Corp., RT PC Hardware Technical Reference, vol. 1, Second Edition, Sep. 1986, pp. 6-4 to 6-28.
IBM Corp., Personal System/2 Model 80 Technical Reference, First Edition, Apr. 1987, pp. 2-6 to 2-20; 2-77 to 2-113 and 3-15 to 3-27.
Toshiba, TC514256 P Integrated Circuit Technical Data, Nov. 1, 1986.
Compaq Computer Corp., D4 Page DRAM Board Schematics and Timing Diagrams (submitted under MPEP §724), Aug. 6, 1986.
Intel Corporation, Microprocessor and Peripheral Handbook, vol. I, 8237A High Performance Programmable DMA Controller, 1988, pp. 2-234 to 2-252.

Primary Examiner—Stuart N. Hecker
Assistant Examiner—Rebecca L. Rudolph
Attorney, Agent, or Firm—Pravel, Gambrell, Hewitt, Kimball & Krieger

[57] ABSTRACT

The present invention is a computer system which can perform master unit controlled memory accesses at a first rate, DMA controlled operations at a second rate and burst operations of both types at a higher third rate. The burst operation is set up by performing a standard access cycle, thus setting up the dynamic random access memory row address, and then performing a series of fast, column address-only accesses to the same page of memory. The fast mode must be exited to a standard rate access whenever a page boundary is crossed, with burst operations recommencing thereafter. Wait states can be inserted in all type operations. Timing diagrams and controller state machines are disclosed.

18 Claims, 9 Drawing Sheets

COMPUTER SYSTEM WITH HIGH SPEED DATA TRANSFER CAPABILITIES

BACKGROUND OF THE INVENTION

1. Field of the Invention

The present invention relates to interface standards used within computer systems, and more particularly to interfaces or busses handling normal and high speed data transfers.

2. Description of the Prior Art

Microprocessors and the personal computers which utilize them have been becoming more powerful over the recent few years. Currently available personal computers have capabilities easily exceeding the mainframe computers of twenty to thirty years ago and approach the capabilities of minicomputers currently manufactured. Microprocessors having word sizes of 32 bits wide are now available, whereas in the past eight bits was conventional and sixteen bits was common.

Personal computer systems have developed over the years and new uses are being discovered daily. The uses are varied and, as a result, have different requirements for the various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system.

The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporation (IBM) personal computer, the IBM PC. The IBM PC utilized an Intel Corporation 8088 as the microprocessor. The 8088 has an eight bit, or one byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems, such as video output units or mass storage units, were not complex and also had relatively low performance levels because of the relative simplicity of the devices available at a reasonable cost at that time.

With these various factors and the component choices made in mind, an interface standard was developed and used in the IBM PC. The standard utilized 20 address lines and eight data lines, had individual lines to indicate input or output (I/O) space or memory space read or write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped and capacities and speeds increased. Performance rates and capacities of the mass storage subsystems increased, generally by the incorporation of hard disk units for the previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which were previously very complicated on the 8088.

It was desired that the existing subsystem circuit boards be capable of being used in the new AT, so the interface standard used in the PC was utilized and extended. A new interface standard was developed, which has become known as the Industry Standard Architecture (ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystem circuit board was capable of using the extended features. While the address values are presented by the 80286 microprocessor relatively early in an operation cycle, the PC interface standard could not utilize the initial portions of the address availability because of different timing standards for the 8088 around which the PC interface standard was designed. This limited the speed at which operations could occur because they were now limited to the interface standard memory timing specifications and could not operate at the rates available with the 80286. Therefore the newly added address lines included address signals previously available, but the newly added signals were available at an earlier time in a cycle. This change in address signal timing allowed operations which utilized the extended portions of the architecture to operate faster.

With the higher performance components available, it became possible to have a master unit other than the system microprocessor or direct memory access controller operating the bus. However, because of the need to cooperate with circuit boards which operated under the new sixteen bit standard or the old eight bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and on other master units.

Additionally, the master unit was required to utilize the direct memory access controller to gain control of the bus, limiting prioritizing and the number of master units possible in a given computer system.

The capability of components continued to increase. Memory speeds and sizes increased, mass storage unit speeds and sizes increased, video unit resolutions increased and Intel Corporation introduced the 80386. The increased capabilities of the components created a desire for more use of master units, but the performance of a master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address. The local area network (LAN) concept, where information and files are stored on one computer called the server and distributed to local work stations having limited or no mass storage capabilities, started becoming practical with the relatively low cost of the high capability components needed for an adequate server and the low cost of the components for a work station.

An extension similar to that performed in developing the ISA could be done to fully utilize the 80386's capabilities but this extension would have certain disadvantages. With the advent of the LAN concept and the high performance requirements of the server and of video graphics work stations used in computer-aided design and animation work, the need for very high data transfer rates became critical. An extension similar to that performed in developing the ISA would not provide this capability, even if a slightly shorter standard cycle time was provided, because this would still leave the performance below desired levels.

SUMMARY OF THE INVENTION

A computer system incorporating the present invention can utilize the capabilities of the present computer components, has slightly shorter standard cycle times and has a mode for providing a very high rate data transfer to or from the system's memory. A computer system incorporating the present invention provides the increased address and data lines necessary to allow use of the full memory address range and 32 bit word width of the Intel Corporation 80386. New state indication and address control signals are provided on a new connector. The new signals are for use by units capable of operating on 32 bit wide data and address buses and by new master units. The state indication and address control signals of the ISA standard are still utilized for operation with circuit boards that do not support the new 32 bit extended architecture and specifications.

A first standard cycle rate is provided for DMA operations which utilize the 32 bit extended standard and a second standard cycle rate is provided for all other memory operations which utilize the 32 bit extended standard, whether by the central processing unit (CPU) or a master unit located on a circuit board. These standard cycle rates are based on a given number of synchronization signal cycles, generally four for DMA operations and two for other operations.

A third cycle rate is provided for all operations, wherein the cycle lasts only one synchronization signal cycle, allowing a very high data transfer rate, especially when it is understood that 32 bit wide information is being transferred. The third cycle, referred to as a burst cycle, allows utilization of the page mode operation of dynamic random access memories (DRAM's). DRAM's are constructed so that the array of transistors forming the storage cells are in a rectangular formation, with resulting row and column addresses used to select a given storage cell. This use of row and column addressing has been carried over to the physical connectors to the memory device to allow multiplexing of the address values and the resulting reduction in device size. Conventionally, the row address is asserted first, with the column address being asserted second. In page mode operation the row address is set and a series of column addresses are presented, thus selecting a series of storage cells on a single row, referred to as a page. When using the burst cycle the row and column addresses are set in a first setup cycle with standard cycle times, the remaining operations are performed at the third cycle rate because the row address need not be changed, only the column address. Of course, static random access memories, with their faster cycle times, or other fast devices could also be utilized as the memory devices, but the costs of such a design would generally be higher than one using the reactively inexpensive DRAM's.

In this manner a very high transfer rate can be developed between memory and the unit controlling the bus and yet allow the use of relatively inexpensive components.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 243,327, entitled "Multiple Word Size Computer Interface with Master Capabilities" by Paul R. Culley, filed on Sept. 9, 1988;

U.S. application Ser. No. 242,728, now U.S. Pat. No. 4,999,805 entitled "Extended Input/Output Circuit Board Addressing System" by Paul R. Culley and Montgomery McGraw, filed on Sept. 9, 1988;

U.S. application Ser. No. 242,954, entitled "Programmable Interrupt Controller" by Paul R. Culley, and Montgomery McGraw, Karl N. Walker and Lazaro D Perez, filed on Sept. 9, 1988; and U.S. application Ser. No. 242,734, entitled "Method and Apparatus for Configuration of Computer System and Circuit Boards" by Curtis R. Jones, Jr., Robert S. Gready, Roberta A. Walton, Daryl George, Michael Griffin, Pamela H. Williams, Beatrice D. Pipes, Montgomery C. McGraw and Scott C. Farrand, filed on Sept. 9, 1988, all of which are assigned to the assignee of this invention.

Figure 1:
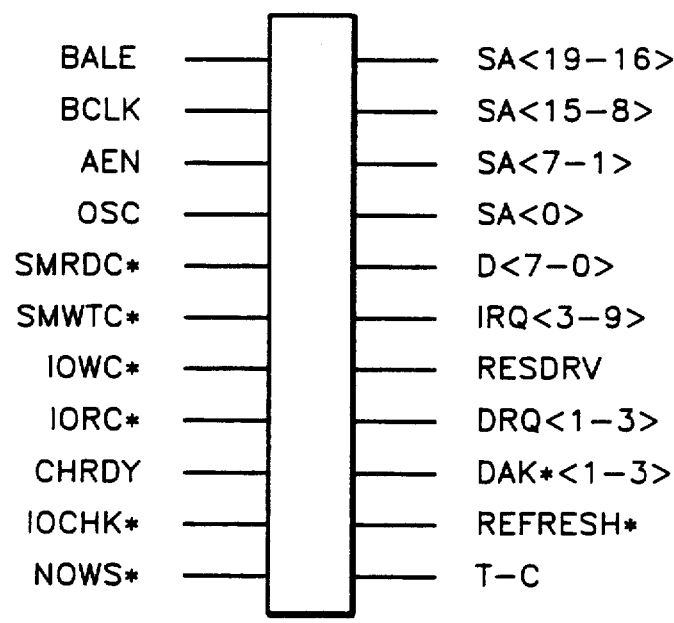
FIG. 1 is a diagram illustrating the connectors and signals of a computer system incorporating the present invention.
Figure 1:
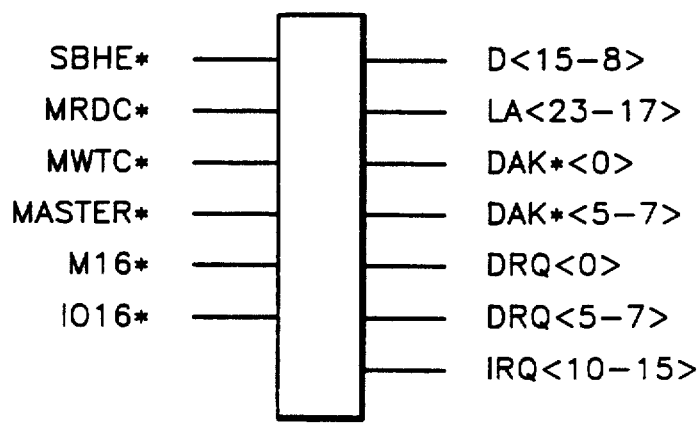
Figure 1:
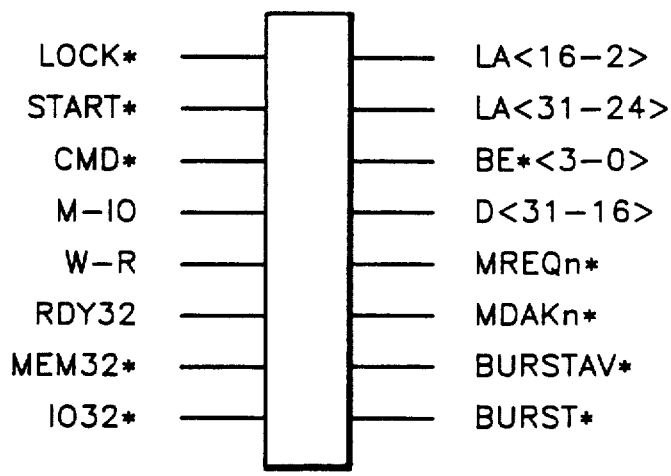

A computer system incorporating the present invention has a system board which has a number of locations or slots for inclusion of interchangeable circuit boards. Each location has at least one connector, the 8 bit IBM PC standard connector referred to by the numeral 8 (FIG. 1). If the location is an ISA standard location, it has an additional sixteen bit extension connector 16. Finally, each location which incorporates the present invention has a third connector, a 32 bit connector 32. Each connector 8, 16 or 32 has included a series of lines which are designated for carrying various signals, which are the logical representation of the desired function and generally have the same identification mnemonic. The signals associated with the 8, 16 and 32 bit connectors 8, 16 and 32 are shown with the respective connectors in FIG. 1. The various power and ground lines included in each connector are not shown for reasons of clarity. The various lines, with a few exceptions, are connected to each connector 8, 16 and 32 at each location, so that a bus results. This is the bus which is generally referred to in this specification. In general when referring to signals in this description, an asterisk (*) after a signal mnemonic indicates that it is logically true when a low level is present and angle brackets with included numbers after a signal mnemonic are used to indicate single or multiple bit positions in a wider logical signal, such as the data or address fields.

Various mnemonics are assigned to the signals and each of the signals has a given logical meaning. The logical meanings of various signals illustrated in FIG. 1 will be explained at this time. The SA<19-16>, SA<15-8>, SA<7-1> and SA<0> signals are the 20 bits of address information originally provided in the IBM PC. Generally, the addressing information is enabled onto these lines when the valid address signal BALE, for address latch enable, is high. The addressing information present on the SA lines is intended to be latched or otherwise stored on each interchangeable circuit board when the BALE signal goes from a high to a low state. These SA address lines are provided in addition to the address lines LA<23-17>, LA<16-2>, and LA<31-24> which are for use with the pipelined address values presented by the system microprocessor if it is, for example, an 80286 or 80386. The addressing information is available on the LA lines for a period of time before the information is available on the SA lines, thereby allowing faster operation of the various circuit boards which utilize these lines and ( signals. It is to be noted that the signals LA<16-2> and LA<31-24> are available only on the 32 bit connector 32. Four additional addressing signals, which are referred to as the byte enable signals BE*<3-0> are also present on the 32 bit connector 32. These signals are provided by the 80386 to indicate which byte or bytes of the 32 bit double-word is desired.

The 32 data lines present in the computer system are the signals or lines referred to as D<7-0> on the 8 bit connector 8, D<15-8> available on the 16 bit connector 16, and D<31-16> present on the 32 bit connector 32. Thus a circuit board utilizing all 32 bits of data available when using the new 32 bit extension standard must connect the various bytes of information to the various connectors 8, 16 and 32.

Numerous interrupt request lines were present on the 8 and 16 bit connectors 8 and 16 to allow the various circuit boards to present interrupts to the system board when necessary. These interrupt signals are identified as IRQ<3-7, 9> and IRQ<10-12, 14, 15> on the 8 and 16 bit connectors 8 and 16.

The computer system can perform direct memory access (DMA) functions wherein information is transferred directly from an I/O space location contained on a circuit board to a memory space location contained on another circuit board or on the system board. Lines must be available to allow signals o indicate when information is available for transfer, so that control of the bus can be transferred to the DMA controller. Additionally, lines must be available to allow a signal to indicate when a DMA request is acknowledged. The DMA request signals DRQ<1-3> and DRQ<0> and DRQ<5-7> are supplied on the similarly identified lines to present the DMA requests. The acknowledgements of the various requests, which are granted to indicate that the specific requesting device may operate, are identified as the DAK*<1-3>, DAK*<0>, and DAK*<5-7> signals and lines. A T-C line is provided on the 8 bit connector 8 to allow indication that the terminal count or last count of a DMA operation has been reached.

In the ISA standard, a master unit had to issue a DMA request to obtain control of the bus. The master unit then awaited for the acknowledgment signal, at which time the master unit took the MASTER* signal low, indicating that a master unit was controlling the bus. The presence of this signal disabled any devices or circuitry which would otherwise normally be presenting address and control information on the bus, such as the DMA controller. Because this circuitry was cumbersome and did not allow sufficient prioritizing and control scheduling, master unit request and master unit request acknowledgment signals are provided in the 32 bit connector 32. These signals are referred to as MREQn* and MDAKn*, where the "n" refers to the specific location or slot of the connector. The addition of these signals provides a manner of changing and adding flexibility to the prioritization of master unit requests and allows the DMA channels to be reserved for more conventional direct memory access type operations.

Because of the costs of various types of memory, personal computer systems generally utilize dynamic random access memory for the main memory systems. Dynamic random access memory (DRAM) is generally available at a significantly lower cost per bit than static random access memory and therefore has allowed the development of the personal computers having very large amounts of memory. However, DRAM's must be periodically refreshed or they will lose the stored information. To facilitate this refreshing operation, a REFRESH* signal is present on the 8 bit connector 8 to indicate that the refresh operation is occurring. The presence of this signal indicates that the various address lines and control signals are operating in the refresh mode to allow the refreshing of the entire system memory at one time.

A reset signal is provided on the 8 bit connector 8 and is referred to as RESDRV. The presence of this signal allows the various circuit boards to be reset during power-up operations.

Because computers generally operate in a synchronized relationship where events must occur in relationship to a controlling signal, a synchronizing clock is generally necessary and is provided in this case by the BCLK signal provided on the 8 bit connector 8. For purposes of this description, the BCLK signal has a frequency between 6.0 MHz and 8.333 MHz, with a nominal value of 8.0 MHz, and has a nominal duty cycle of 50%. This synchronizing signal is different than the OSC signal, which is provided for timing applications and has a frequency of 14.31818 MHz and a duty cycle of approximately 50%. The OSC signal is not synchronized, but is provided for genera clocking features, whereas the BCLK signal is synchronized to the microprocessor's system clock and is used as the reference for interface signal timing requirements.

A signal referred to as the AEN signal is provided on he 8 bit connector 8 to indicate to the circuit boards that the DMA controller is in control of the bus. One of he functions of this signal is to indicate to an I/O device that it must not respond to the other signals being presented on the bus. However, the AEN signal is not used by a circuit board when that board must respond to a DMA operation. This DMA response need is determined by coordinating the DMA acknowledged signal DAK* with the AEN signal, so that if the circuit board's DAK* signal is high, indicating that it is not being accessed, then when the AEN signal is high, any addressing information is not utilized.

An IOCHK* line is provided on the 8 bit connector 8 to signal the system about parity or other serious errors which have occurred on the circuit boards plugged into the various connectors. This signal is used when an uncorrectable error occurs so that further processing is not performed on any erroneous data.

On the 32 bit connector 32 a new line referred to as LOCK* is provided for interaction with circuit boards which contain local memory and local processing capability. The information stored in the local memory may be changed by the local processor at the same time that the local memory information is being requested by the device controlling the bus, thus resulting in the bus device receiving incorrect information. When the LOCK* signal is asserted low, the local processing devices cannot access the local memory, to prevent data values from changing between accesses by the device controlling the bus.

The remaining signals provided on the three connectors 8, 16 and 32 are state indication and address control signals. The signals are used to indicate the operating slate of the bus or the need for accessing to the various I/O or memory spaces. In general, the state indication and address control signals of the 8 and 16 bit connectors 8 and 16 are such that individual signals are presented to indicate whether a memory or I/O space operation read or write is being performed. For example, the MRDC* or SMRDC* signals are made active during a memory read cycle. The SMRDC* signals are enabled only when a memory read operation within the first 1 Mbyte of memory is occurring. In a similar manner, the MWTC* and SMWTC* signals are used to indicate a memory write operation, while the IORC* and IOWC* signals are used to indicate I/O space read and write operations, respectively. Because the various I/O devices and memory devices have differing speeds, it is necessary for the bus controller to know whether a particular device can respond faster than a given normal rate or slower than a given normal rate. For this reason, a signal referred to as NOWS* is provided to indicate that no further wait states are necessary when addressing that particular device, and a CHRDY signal is provided to indicate that the particular device is not ready at that time.

A signal referred to as SBHE* is provided on the 16 bit connector 16 to indicate that the D<15-8> lines will be used in the data transfer. Two additional address control signals, referred to as M16* and I016*, are provided on the 16 bit connector 16 to indicate that a 16 bit device will respond to the information request or cycle present on the bus. The M16* signal is developed from the use of the LA address signals and thus is presented early in a given cycle. The presence of either the I016* or M16* signal indicates both that the device will respond using the 8 and 16 bit connectors 8 and 16, and that the device can respond to a shorter standard cycle time than a device which is attached to only the 8 bit connector 8. This shorter standard cycle time is possible because of the various improvements in component speeds which occurred between the development of the IBM PC standard and the ISA standard. These state indication and address control signals represent the state indication and address control signals necessary for operation under the ISA standard and for operation with 8 and 16 bit wide data. These signals are utilized by existing 8 and 16 bit circuit boards designed for operation with the IBM PC or ISA standards.

A wholly separate set of state indication and address control signals are provided for the 32 bit extended standard. The START* and CMD* signals are provided for timing control in a 32 bit cycle. The START* signal is asserted after the address has become valid and is generally deactivated after one full BCLK cycle time. The START* signal thus indicates the start of a 32 bit cycle. The CMD* signal is asserted low when the START* signal is deactivated and is continued at a low state until the end of the cycle. Thus the START* and CMD* signals are used to indicate the beginning and end of a 32 bit extended standard cycle, with various events happening in synchronization with the BCLK signal after the assertion of the START* or CMD* signals. M-IO and W-R signals are used to indicate whether a memory or I/O space cycle is being performed and whether the operation is a read or write operation in that given space. These two signals are used in contrast to the six signals provided in the ISA standard to indicate similar information. A separate line used to indicate that the device or data is not ready is provided on the 32 bit connector 32 and is referred to as the RDY32 line. It is also necessary to know whether the addressed device will respond according to the 32 bit extended standard and this is determined by signals presented on the MEM32* or IO32* lines. These signals have similar meaning to the M16* and I016* signals, but are also used to indicate whether an operation can be completed wholly using the 32 bit extended standard or must be completed using the ISA standard.

Finally, two additional signals referred to as BURST* and BURSTAV* are provided on the 32 bit connector 32. These signals are used to indicate that a memory burst operation is being requested and may occur, to allow the very high throughput of the present invention. The operation of these two signals, in combination with the other appropriate signals will be explained in detail. Thus it can be seen that there is a wholly separate set of state indication and address control signals provided on the 32 bit connector 32.

The proceeding is a summary of the various lines and signals which are present on the 8, 16 and 32 bit busses 8, 16 and 32. The operation of the present invention with master units and the DMA controller are illustrated in this description. The various events which occur will be explained in relation to both rising and falling edges of the BCLK signal as this is the synchronizing signal for the control sequences. For purposes of this description the central processing unit (CPU) of the system may be considered a master unit, particularly when addressing memory located in a connector location. While in the preferred embodiment the CPU does not generally perform memory burst operations according to the present invention, this is because the CPU interfaces with the main portion of the memory in a different manner than over the 8, 16 and 32 bit connectors 8, 16 and 32 and so does not need the capability. If the CPU must interface to the memory over the 8, 16 and 32 bit connectors 8, 16 and 32, burst operations would be similar to those of a master unit, and thus a master unit is not limited to being located on a circuit board located in a slot, but can include the CPU. Master units located on circuit boards and the DMA controller utilize the 8, 16 and 32 bit connectors 8, 16 and 32 to access memory, either memory located on a circuit board or the main portion of the memory in the preferred embodiment.

Described first will be the operation with regards to the various signals presented if a master unit is in control of the bus. After completing the description for the read and write operations for master units the description will proceed to a similar description of operation when the DMA controller is in the control of the bus. Cycle A is assumed to commence at time 300. At this time the bus controlling master unit asserts the address line values to the LA lines and sets the M-IO signal, in this case to a memory state or high condition because burst operations can be performed only to memory spaces and are defined as not being performable in the preferred embodiment to the I/O space. Additionally at this time, the bus controlling unit may set the W-R line to the desired state, in cycle A to the low state, or can delay this event until the next rising edge of the BCLK signal.

At the next rising edge of the BCLK signal at time 302, the W-R signal must be set to the appropriate state if not already done and the START* signal is made low, the CMD* signal is made high if it was low from a previous cycle and the data present on the data lines from the previous cycle is latched. Additionally at time 302 the BE*<3-0> values are asserted. The dashed line which appears vertically at time 300 and time 302 is used to indicate a cycle of the machine and is drawn slightly after it occurs for reasons of clarity. It is to be noted that the dashed line is not straight because the address-related signals are pipelined one-half BCLK signal cycle before the actual data controls to provide extra time to allow address decoding.

Proceeding to the next edge of the BCLK signal, which is a falling edge at time 304, the BALE signal is made high by the system board for use by circuit boards or responding units which utilize the ISA standard and not the 32 bit standard. When the BALE signal goes high, the system board transfers the address values to the SA lines. Burst operations cannot be performed by any of these devices and therefore the timing diagrams do not show an example of a response by an 8 or 16 bit ISA device. Should a 32 bit device not respond, the burst cycle is not performed but instead a conventional cycle is performed as disclosed in the co-pending application entitled "Multiple Word Size Computer Interface with Master Capabilities" which has been incorporated by reference.

Figure 2:
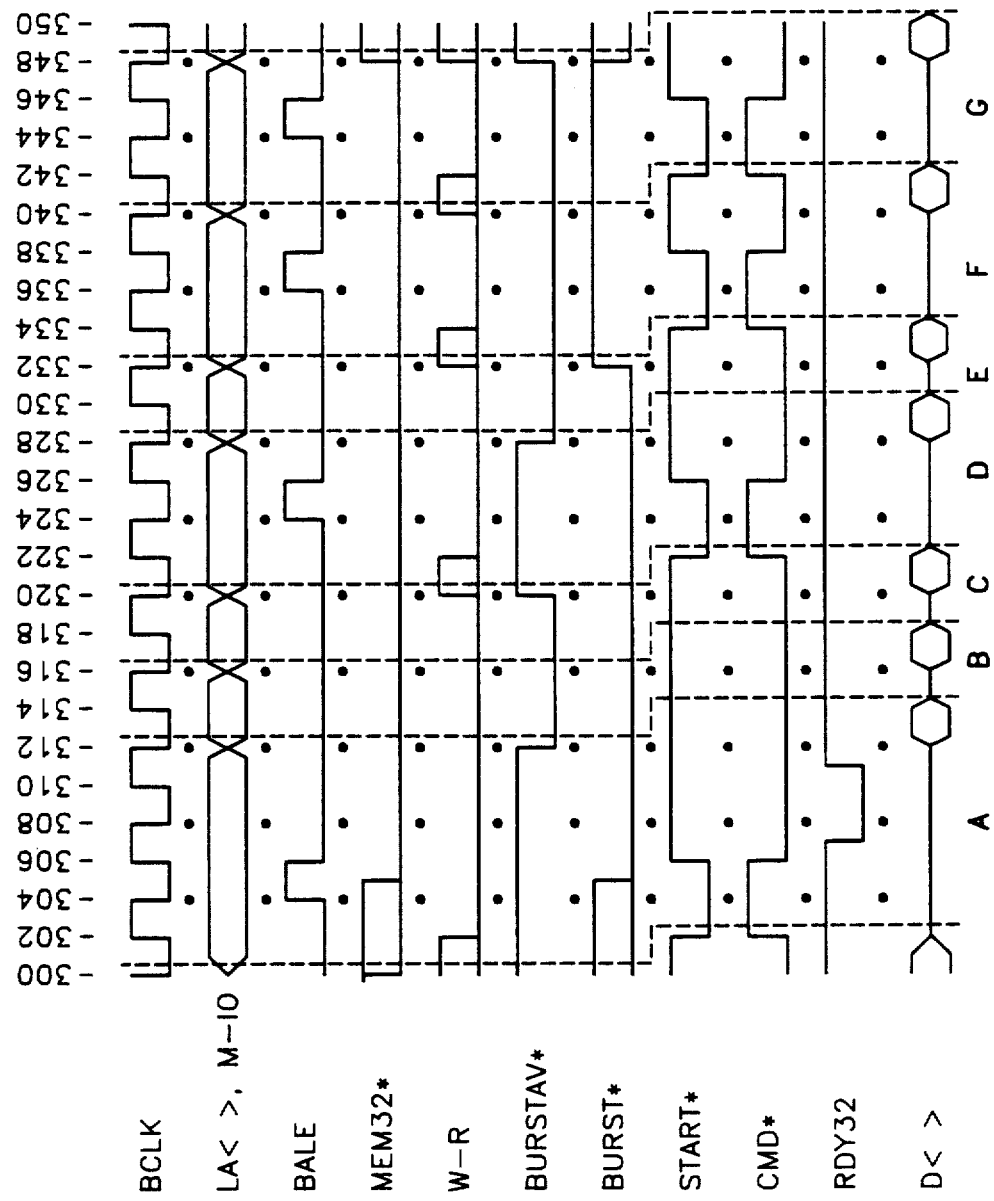
FIGS. 2-5 are timing diagrams showing the waveforms of various portions of a computer system incorporating the present invention.

At a time prior to the next rising edge of the BCLK signal at time 306, the MEM32* and BURST* signals must go low if they will be going low. The MEM32* signal is used to indicate that a 32 bit device will be responding and thus which state information and address control signals will be utilized to transfer from the responding unit. The BURST* signal is a signal which indicates that the particular responding device can perform burst operations and should always be asserted low if the device can respond. It is assumed that this can be done in the same operation as the memory decode and for that reason the timing shown in FIG. 2 is similar.

At time 306, the BALE signal is made low, causing the system board to latch the SA signal values until the next rising edge of the BALE signal. Additionally at time 306, the START* signal is made high and the CMD* signal is made low to indicate that the operation of cycle A is proceeding. Prior to the next edge of the BCLK signal, which is a falling edge at time 308, the RDY32 signal must be low if it will be made low to indicate that the device will not be capable of responding to the operation without the need for additional wait states. In cycle A as shown, the RDY32 signal does go low prior to time 308 so that a wait state will be inserted. The BCLK signal proceeds through the high to low transition at time 308 and the low to high transition at time 310. Just after time 310 and before the falling edge of the BCLK signal at time 312, the RDY32 signal is removed to indicate that the device will now be able to respond. Time 312 is the end of the address phase of cycle A so that the next address is asserted on the LA lines. Also at this time, the master unit lowers the BURSTAV* signal to indicate that this is the beginning of a burst cycle and that the responding unit should so operate. During a burst cycle in the preferred embodiment the address lines LA<31-11> cannot change because the operation is defined such that this enables the responding device not to require the complete address to be enabled to the memory devices but instead only the column addresses need be activated. A page size of 512 bytes is thus defined, with the resulting 32 bit wide block encompassing 2048 bytes of memory space. This allows the responding unit to use conventional 256 kbit×1 or larger DRAM's in their page mode operation so that high cycle rates can be obtained using conventional, relatively inexpensive devices. The first cycle of a burst cycle, in this case cycle A, must be a full length memory cycle because in that operation it is required that the row address be set up and this requires an additional BCLK signal cycle. After the row address is set up, the master unit may then proceed into burst mode. The master unit can provide any address within the page and need not sequentially change the address when in burst mode. Additionally, at any given address, the use of the BE*<3-0> signals allows any proper combination of the four bytes comprising the 32 bit double word to be transferred at that address, thus allowing burst operations to begin and end on other than even double word boundaries and other specialized transfers to be performed.

Proceeding to time 314, the master unit samples the data lines to store the information which was available in cycle A from the responding unit to complete cycle A. At this time the responding unit begins preparing the data at the new address presented at time 312 for presentation to the data lines.

At time 316, the falling edge of the BCLK signal, is the end of the addressing portion of cycle B in burst mode and therefore the new LA<10-2> signals are provided to the LA lines and the BE* lines are set as appropriate. Proceeding to time 318, the master unit then samples the data lines to store the data which has been provided by the responding unit. Therefore it can be seen that a burst cycle is only one BCLK signal cycle long, which in the preferred embodiment is 125 nanoseconds. With this cycle time operating on a 32 bit wide double-word, an effective throughput rate of 32 Mbytes per second results. It is to be noted that the START* and CMD* signals do not change state during the burst cycle, but instead remain at their level until the end of the cycle.

Proceeding now to the next falling edge of the BCLK signal at time 320, this is assumed to be an address which will exceed the page boundary limits so that the row address in the selected DRAM's must be changed. Therefore this, by necessity, must be a long cycle or erroneous information would be received. Because the preferred mode of operation for a responding unit will be to have the upper address bits latched so that only the lower address bits will be utilized in the short portions of a burst cycle, if burst mode is unexited, erroneous information will be obtained because the responding unit will cycle to the appropriate lower address location but on the wrong page. Therefore also at time 320, the BURSTAV* signal is made high to indicate that this is not a burst cycle.

At time 322, the START* signal is made low and the CMD* signal is made high to indicate the beginning of a new memory cycle D. Further at time 322, the data which was presented by the last read operation in the burst cycle is stored by the master unit. Proceeding then to time 324, which is at the next edge of the BCLK signal, the BALE signal is made high in case an ISA standard device will be responding to this address. At time 326 the BALE signal is made low, the START* signal is made high and the CMD* signal is made low. RDY32 has not been asserted by time 328 which is the next falling edge of the BCLK signal. Thus, this will be a cycle which completes without additional wait states and therefore at time 328 the new address is presented to the LA lines and, because a burst cycle is desired, the BURSTAV* signal is made low. The example shown is illustrative of a case where a burst was desired and is responded to by a single responding unit, but the desired address range of the burst access crossed over a page boundary and therefore it was necessary to exit burst mode for one cycle to allow the row addresses to be set up.

At time 330 the data from cycle D is stored by the master unit or bus controller. Then at the falling edge of the BCLK signal at time 332 a new address is presented. In this case the illustrated example is such that this responding location cannot support a burst operation and therefore the BURST* signal goes high as soon as this address location is determined, for example, in FIG. 2 it is assumed to happen at time 332. At time 334, the W-R line must be in the desired state and the START* signal is made low, the CMD* signal is made high and the cycle E data which is present on the data lines is stored by the master unit. This is the beginning of the data portion of cycle F, which is a conventional read operation because the responding unit cannot perform a burst operation even though the bus controller would like to perform burst operation as indicated by the fact that the BURSTAV* signal is low. At time 336, the falling edge of the BCLK signal, the BALE signal is made high to allow address latching by ISA circuit boards. At time 338, the next edge of the BCLK signal, the BALE signal is made low. Additionally, the START* signal is made high and the CMD* signal is made low to indicate progression through the cycle. At time 340, the address for the next cycle is presented on the LA lines because RDY32 was not low prior to this edge. Then at time 342, the next edge of the BCLK signal, the W-R line must be in its desired state, the START* and CMD* signals are made respectively low and high and the cycle F data on the data lines is stored. A similar cycle G proceeds at times 344, 346, 348 and 350 where a conventional read cycle is performed because the BURST* signal is high indicating that the responding device cannot perform a BURST* operation and a standard two BCLK signal cycle memory operation is performed.

Figure 3:
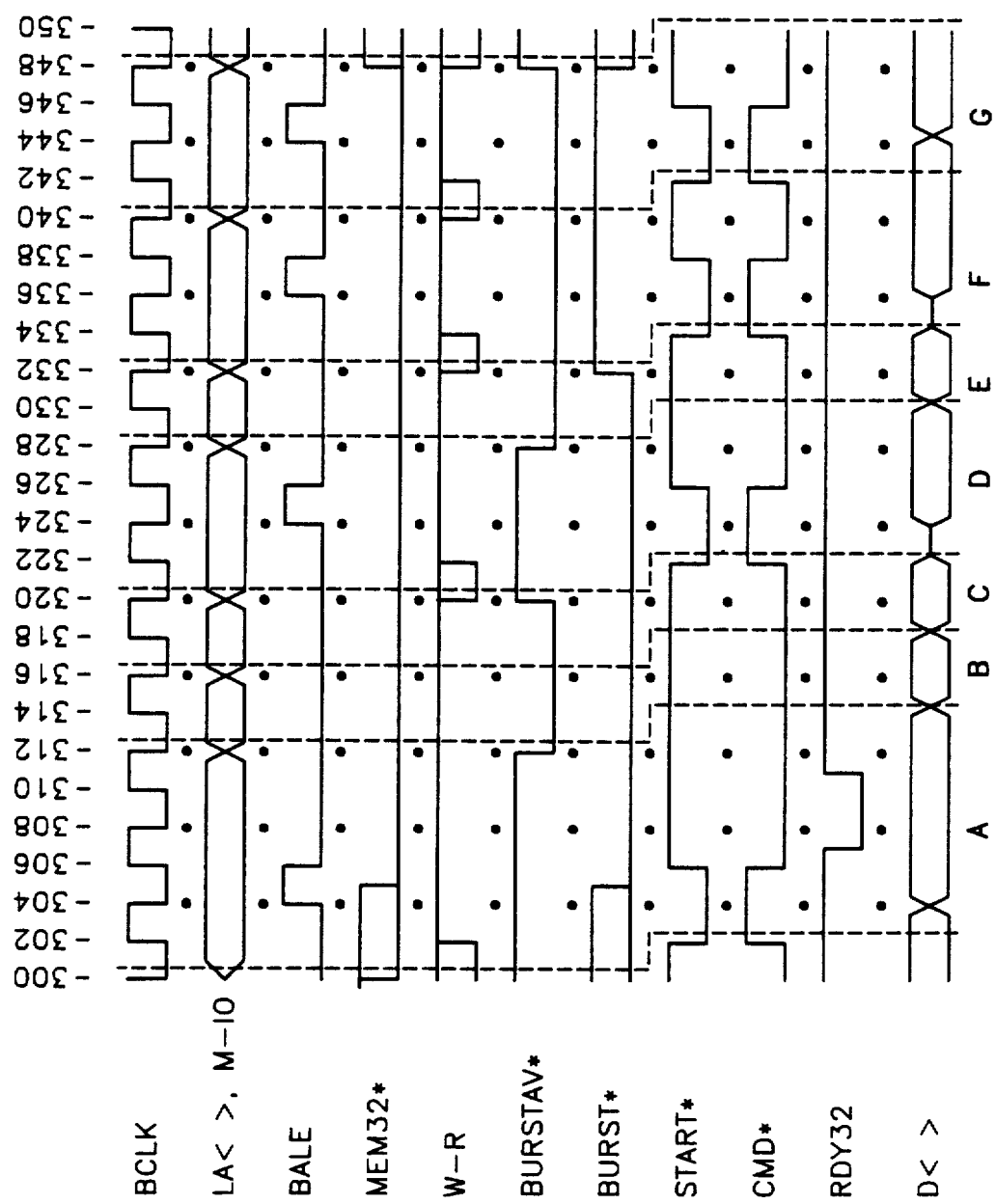

While FIG. 2 is illustrated as a read operation by a master unit, FIG. 3 illustrates the master unit writing to the responding unit. The primary differences are that the W-R signal remains high to indicate a write operation, whereas in the previous example of FIG. 2 the W-R line remained low to indicate a read operation. Further, the data is presented on the data lines differently. For example, the data from the preceding standard cycle remains on the data line until time 304, as is conventional to allow sufficient time for the data to be captured and to be compatible with previous ISA designs. During a burst cycle, the data is removed from the data lines one BCLK signal edge after the address is changed and not two edges as in non-burst cycles. This allows the data to be changed faster on the data bus to help support this fast mode of operation. For example, the data in cycle A is presented at time 304 and removed at time 314, while the data for cycle B is presented at time 314 and removed at time 318. The data for cycle C is presented at time 318 and removed at time 322 while the data for cycle D is presented at time 324, so that a one-half BCLK signal cycle float appears on the data lines. The data is then removed from the data lines at time 330 with the new data being presented at that time for cycle E with the cycle E data being removed at time 334. The remaining portions are conventional cycles. This completes the explanation of the timing sequences of the present invention during master unit operations.

Figure 4:
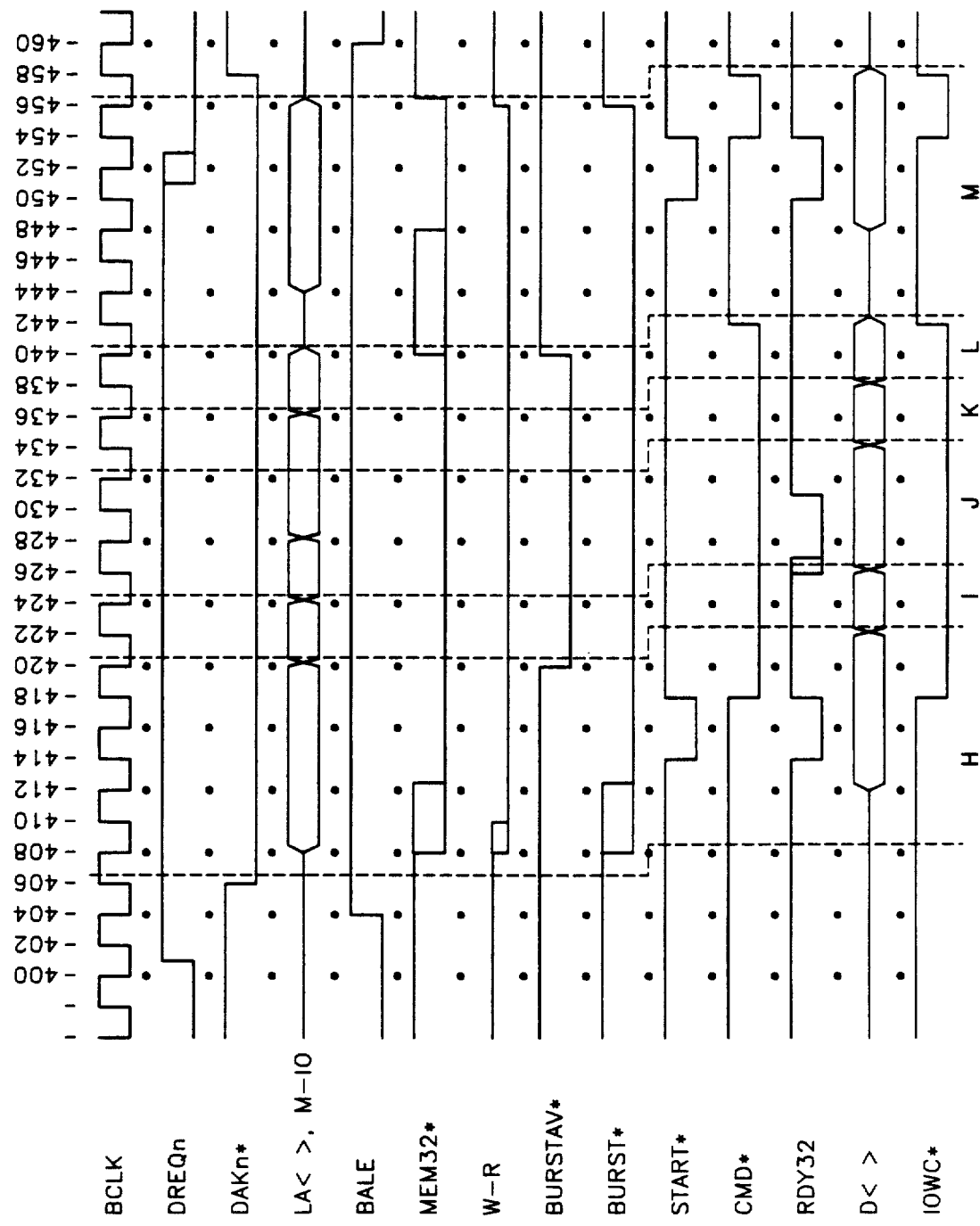
Figure 5:
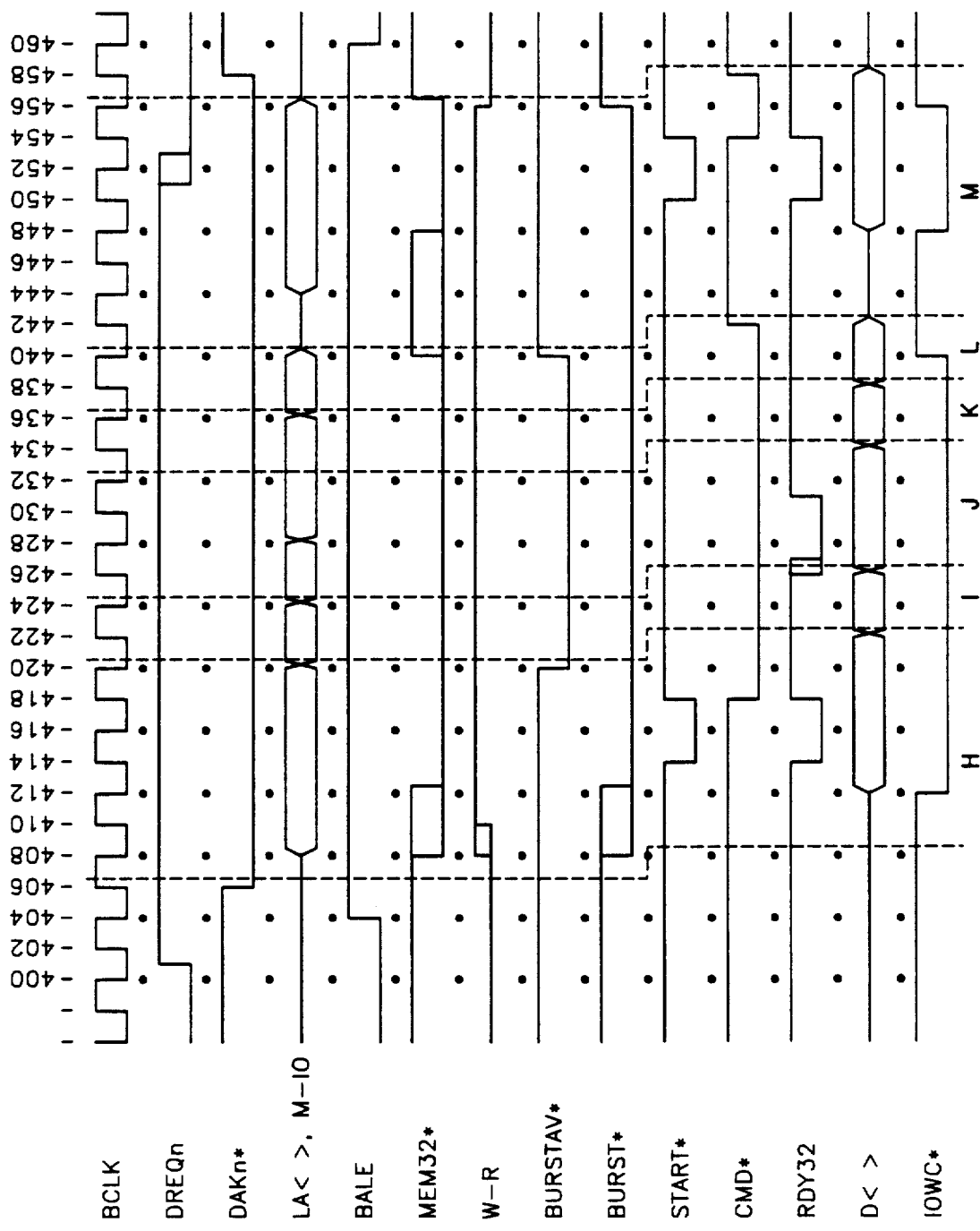

The timing cycles for DMA operations are shown in FIGS. 4 and 5 for memory read and write operations, respectively. The DMA device which is requesting service raises the DREQ* line between times 400 and 402 to indicate to the DMA controller that service is needed. Then at the falling edge of the BCLK signal at time 404 the BALE signal is made high to indicate to the ISA devices that the addresses which are appearing on the address lines are valid. The AEN signal (not shown) also goes high at this time to disable all I/O space operations except to the requesting DMA device. The DMA controller will pass all of the values appearing on the LA lines and the BE*<3-0> lines to the SA lines so that the address is always true on both busses, so that the appropriate memory units can determine their address and respond. The DMA controller priority resolving unit determines when it is appropriate to respond to the DMA request, at which time the DAK* line for that particular DMA channel is made low. For the example shown as FIG. 4, this is to be considered time 406, which is a rising edge of BCLK signal. This initiates cycle H, which is an initial cycle of a DMA operation which will be performed in burst mode to 32 bit memory. The data will be transferred from the 32 bit memory to the requesting DMA device. Proceeding now to the falling edge of the BCLK signal at time 408, the DMA controller presents the address to the LA and BE* lines, which is automatically transferred over to the SA lines, and raises the M-IO signal to a high state to indicate that 32 bit memory is desired to be accessed. The DMA device will interpret the IOWC* signal as it is operating in the I/O space and not memory space. At this time, the W-R signal should be lower to indicate that the memory will be being read, but this could wait one-half BCLK signal cycle. The addressed memory device will begin decoding the addresses presented and indicate whether it is 32 bit memory and whether it is capable of responding to a burst cycle. Proceeding to time 410, the rising edge of the BCLK signal, the cycle is continuing. Proceeding to time 412, the falling edge of the BCLK signal, the data is presented by the memory to the data lines to begin the read operation. Approximately about this time, the MEM32* signal goes low indicating that a 32 bit memory unit will be responding and the BURST* signal goes low indicating that this particular unit can operate in burst mode. Proceeding to time 414 at the rising edge of the BCLK signal, the START* signal is made low and the RDY32 signal is made low. The RDY32 signal is lowered to induce a wait state in the responding memory device to allow relatively slow or compatible DMA devices to be fully set up. The BCLK signal undergoes a high to low transition at time 416 and a low to high transition at time 418. At time 418, the START* and RDY32 signals are raised to indicate, respectively, that the address should be latched and the data cycle will be commenced and that the one necessary wait state has been completed, so the device can respond. Also at time 418, the CMD* signal is made low to indicate that a data portion of the cycle is beginning and the IOWC* signal is made low to indicate to the DMA device that valid data is beginning to appear on the data bus.

At time 420, the BCLK signal goes low. At this time, because the 32 bit read cycle is completing, the DMA device asserts the next address on the LA and BE*<3-0> lines to fully present the next address on the bus. Only LA<10-2> and BE*<3-0> lines can be changed because a burst operation is commencing. At this time it is desired to start a burst cycle now that the memory location has been fully set up on the memory boards such that the row addresses have been fully stored and page mode operation of the DRAM's can begin. Therefore, the DMA controller lowers the BURSTAV* signal to indicate that a burst cycle is commencing. This is the beginning of cycle I. Proceeding to the next rising edge of the BCLK signal which occurs at time 422, the DMA device must sample the data which is appearing on the data busses because the memory device now changes the data to that at the address currently being presented. This terminates cycle H and begins the first true short burst cycle I data portion.

Proceeding to the falling edge of the BCLK signal at time 424, the RDY32 line has not been asserted by the memory device and therefore the next address is presented.

Proceeding to time 426 where the BCLK signal undergoes a low to high transition, the data on the data lines is changed to reflect the new data that is present at the next address and the DMA device latches the data prior to the change. Beginning at this time and before the falling edge of the BCLK signal at time 428, the memory device asserts RDY32 low to indicate that it will not be able to respond in sufficient time and that a wait state is thus necessary. While adding wait states in a similar fashion can be done in non-DMA burst operations, it is generally not desirable because a non-DMA burst cycle with a wait state is the same length as a standard cycle. However, in DMA operations, a standard cycle is four BCLK signal cycles in length, and a burst cycle is one BCLK signal cycle in length, so wait states can be added and the resulting cycle times may still be improved over standard DMA cycle times.

Then at time 428, the DMA device asserts the next address and also recognizes the need for the wait state. The sequence then proceeds though the rising edge of the BCLK signal at time 430 and the falling edge at time 432. Prior to this falling edge, the memory device had removed the RDY32 signal so that it returned to a high stating indicating that the device would be ready. This time essentially initiates the beginning of the address cycle for cycle K even though the address had previously been presented on the address lines at time 428. Proceeding then to time 434, the rising edge of the BCLK signal, the data is latched and changed to proceed to the next cycle. At the falling edge of the BCLK signal at time 436, the address is again changed because a burst cycle is still continuing. The next edge of the BCLK signal at time 438, which is a rising edge, the data is latched and exchanged to that being presented by the existing address location. Proceeding to the next edge of the BCLK signal at time 440, this is a standard cycle for any of a number of reasons, most commonly that the DMA controller has indicated that it must transfer over a page boundary and therefore must terminate the burst mode to allow a fully set up address to be developed. Therefore at time 440, the address lines are floated and the BURSTAV* signal is made high to indicate that a burst cycle will not be performed. Then at time 442, the next edge of the BCLK signal, the CMD* line is made high to indicate completion of an operation, the IOWC* signal is made high to cause the DMA device to latch the final set of data, which is also removed from the data lines at this time.

Having started the conventional 32 bit DMA transfer of cycle M at times 440 and 442, the cycle proceeds to time 444 and the falling edge of the BCLK signal. At this time, the next address is presented on the LA and BE* lines and transferred to the SA lines. The cycle then proceeds to time 446 and time 448 where the data is beginning to be presented by the memory to the data lines for interpretation and storing by the DMA device. Then at the rising edge of the BCLK signal at time 450, the START* and RDY32 signals are made low. It is determined by the DMA device that this is the final cycle of the DMA operation because this is the last piece of information to be transferred. Therefore, sometime prior to the next rising edge of the BCLK signal at time 454, the DREQ* signal is made low to indicate that the DMA device is no longer requesting servicing. Also at time 454, the START* and RDY32 signals are made high and the CMD* signal and the IOWC* signals are made low to indicate the change from the address to the data portion of the cycle and to indicate that the data is becoming valid. Then at time 456 the falling edge of the BCLK signal, the address lines are floated because this is the last cycle in the DMA transfer, which also causes the MEM32* signal and BURST* signals to go high. Also al time 456, the W-R line is floated to allow the next device to control this line. At time 458, the DAK* signal is raised to further indicate that the DMA cycle is completing. Additionally, the CMD* and IOWC* signals are raised to indicate that the data which is appearing on the data lines should be latched by the appropriate device. This completes data transfer cycle M. To fully complete the DMA transfer operation at time 460, the BALE signal is lowered to indicate to ISA devices that addresses which appear on the bus are no longer valid and the AEN signal is lowered to allow I/O space operations to occur.

This has been basically an operation which transfers information from the memory to the DMA device or a memory read and I/O write operation. FIG. 5 illustrates a memory write and I/O read situation wherein data is transferred from the DMA device to memory. The cycles are generay the same except that the W-R signal is in a high state to indicate a memory write instead of a low slate which indicates a memory read. Additionally, the IORC* signal is utilized instead of the IOWC* signal. The IORC* signal is used to enable data from the DMA device onto the bus and therefore has different timing than the IOWC* signal. Specifically, the IORC* signal goes low at time 412 which is when the data is presented to the data lines. The IORC* signal then remains low until time 440, at which time it is raised to indicate that the data will soon be removed from the data lines. The IORC* signal is also made low at time 448 to allow the DMA device to place the data on the data lines at this time. The IORC* signal is raised at time 456 to indicate that the data should begin coming off the data bus. In other respects of FIG. 5, timings are similar to that of FIG. 4.

Figure 6A:
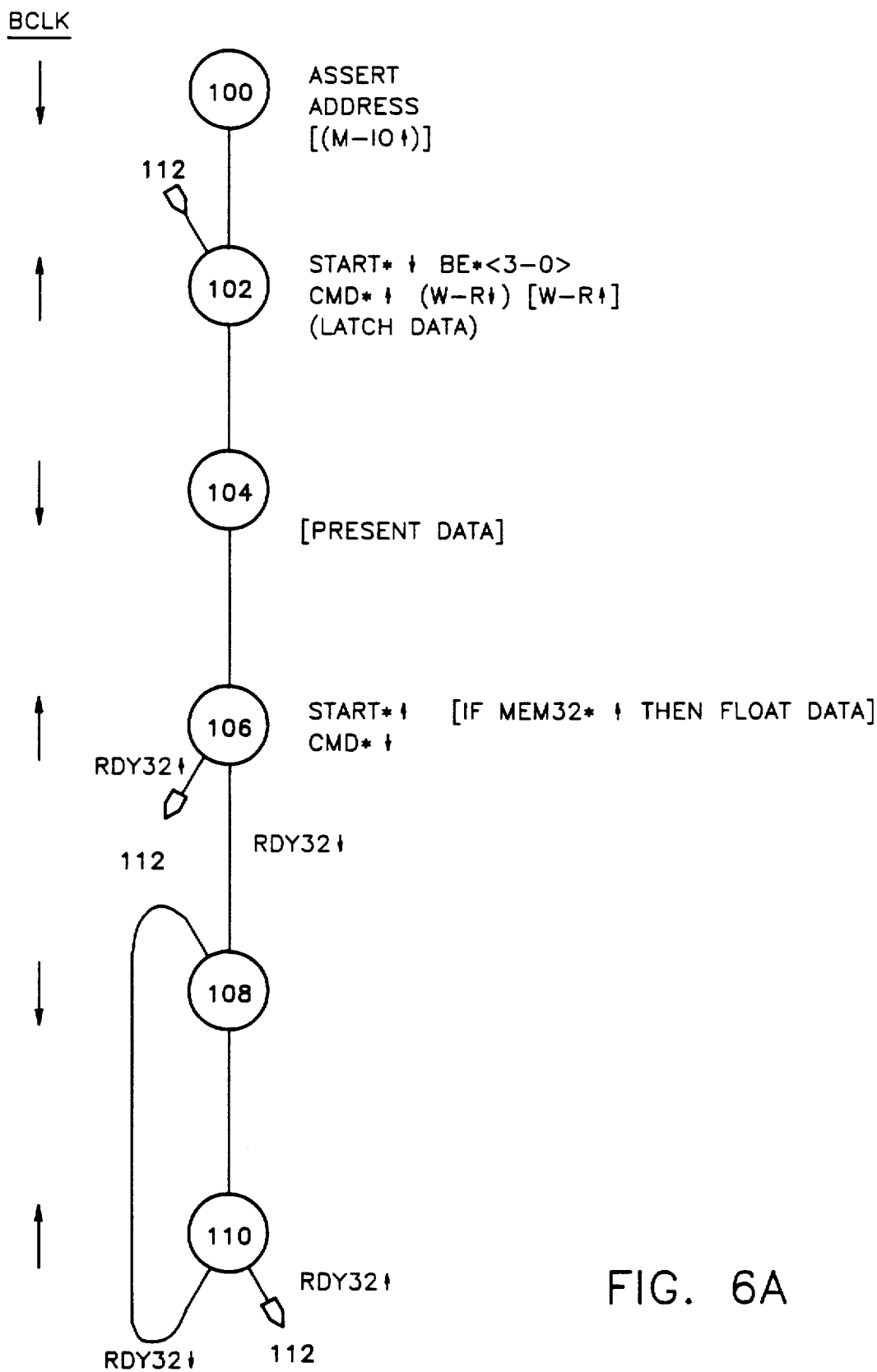
FIGS. 6A and 6B are state diagrams indicating the operations of portions of the circuitry of a master unit in a computer system incorporating the present invention.
Figure 6B:
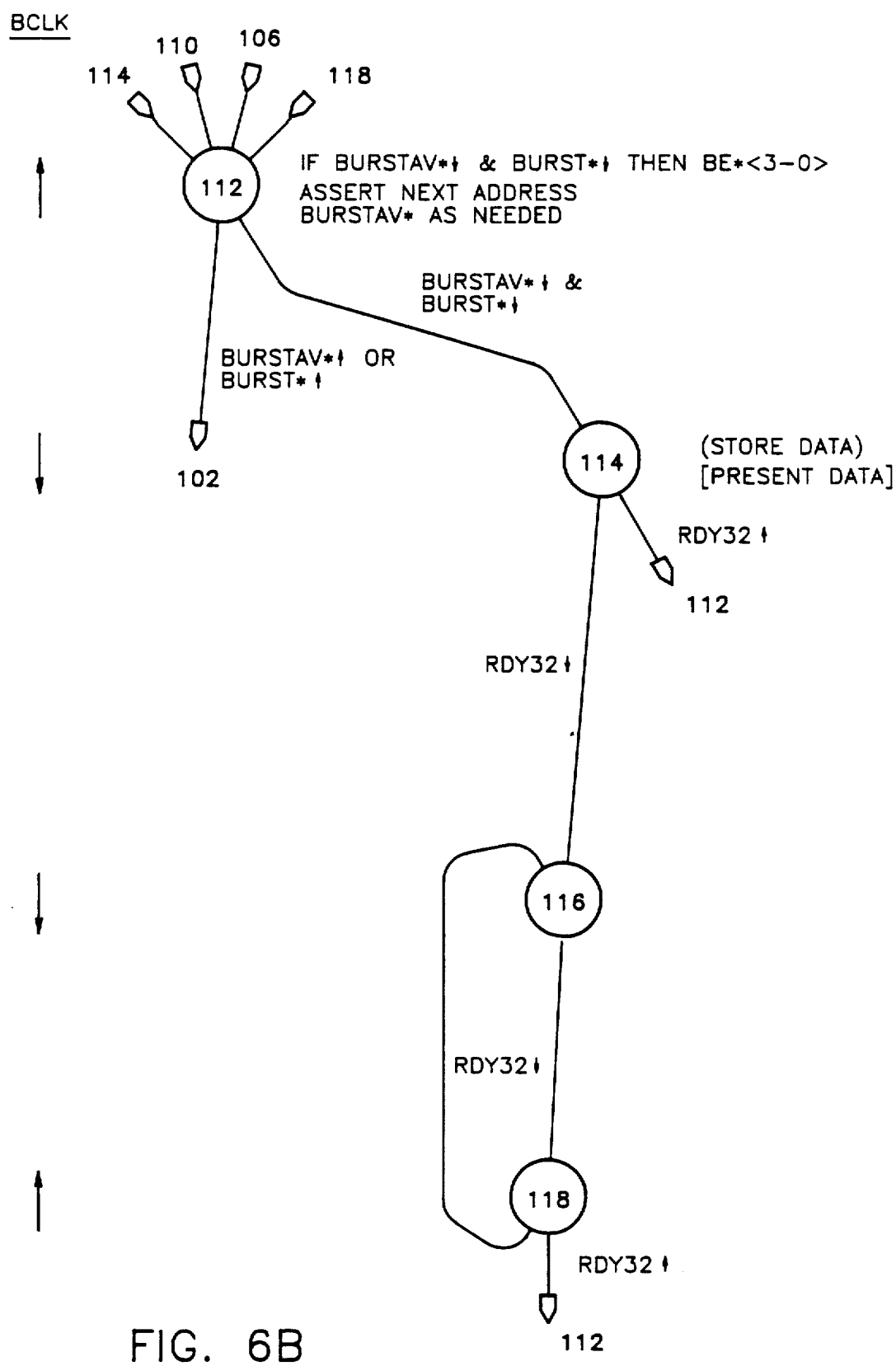
Figure 7A:
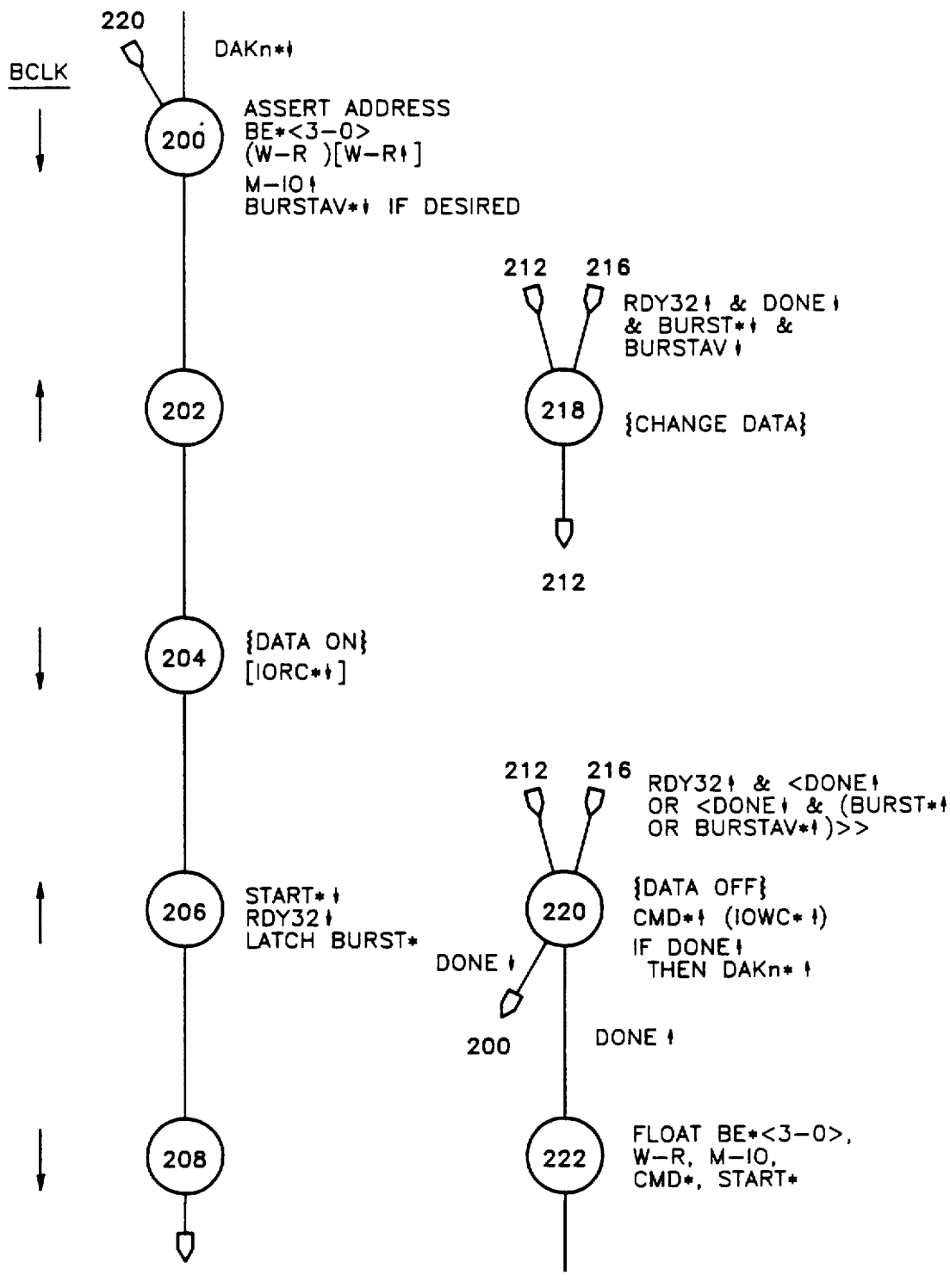
FIGS. 7A and 7B are state diagrams indicating the operations of portions of the circuitry of a DMA controller in a computer system incorporating the present invention.
Figure 7B:
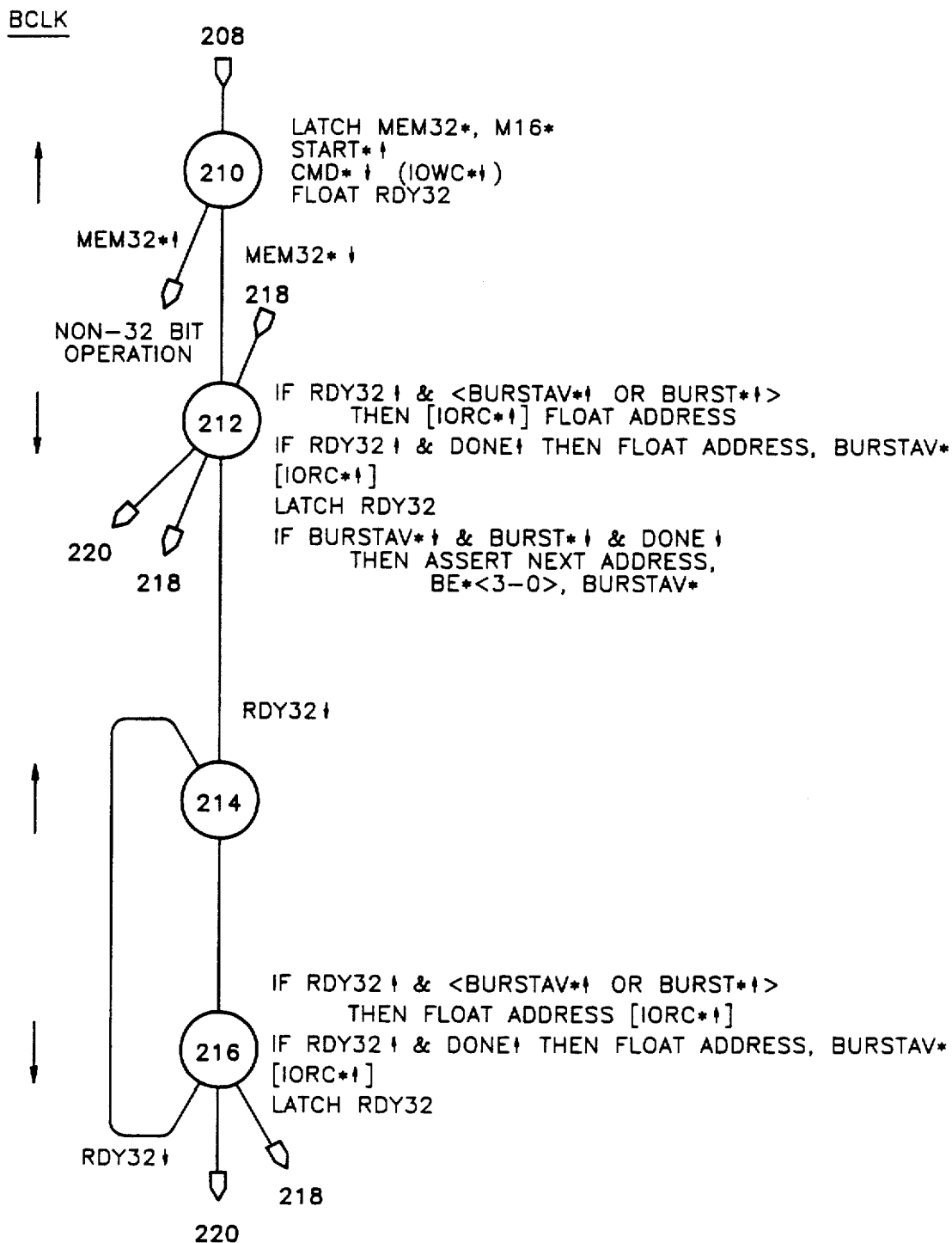

Exemplary state machines which can perform the burst operations as required are illustrated in FIGS. 6A-7B and 7A-7B. FIGS. 6A-6B indicate a master unit which desires to do a transfer to or from memory, while FIGS. 7A-7B illustrate the state machine for a DMA controller doing DMA transfers between particular DMA devices in the I/O space and memory.

The master unit state machine is assumed to start at state 100, which is equivalent to a falling edge of the BCLK signal as indicated in the left column. Generally information located next to an indicated circled state is an operation which is performed at that edge of the BCLK signal or is triggered by that edge of the BCLK signal. Information which is generally next to the lines between the various states represent the conditions under which that branch or exit from the state to the next state is taken. Thus, in state 100, the master unit asserts the address onto the LA lines and sets the M-IO operation high if a burst operation is to be commenced. A burst operation cannot be performed to the I/O space in the preferred embodiment and therefore this example is limited only to that condition. If the I/O operation were to be requested, a burst operation could not be performed in the preferred embodiment and so this portion of a state machine is not provided for clarity.

Control then proceeds to state 102 where the BE*<3-0> lines are asserted to complete the presentation of the full address and the START* signal is made low and the CMD* signal is made high to indicate the beginning and end respectively, of a cycle. Additionally, the W-R signal is set at the desired state, low for a read operation as indicated by the action being in parentheses on the state machine diagram or high if it is a write operation, as shown by the operation being in square brackets on the state machine diagram. Additionally, data which is present on the data bus from the previous cycle of operation is latched or stored by the master unit if the previous operation was a read operation. This is provided for continuity.

Control then proceeds to state 104 where the data is presented onto the data bus if this is a write operation. Control next proceeds to state 106 where the START signal is raised and the CMD* signal is lowered to indicate a transfer from addressing portion of the cycle to the data portion of the cycle. If the MEM32* signal is high indicating that a 32 bit device will not be responding, then the master unit must float the data lines to allow a bus controller unit located on the system board to do proper transfer from the 8 or 16 bit ISA devices that are being addressed. For more details on this master unit and system board combination, particularly with regard to the data assembly required should 8 or 16 bit devices respond, please refer to the co-pending application entitled "Multiple Word Size Computer Interface with Master Capabiities" which has been incorporated by reference. These devices cannot perform burst operations and therefore the operation of the system board bus controller which performs the necessary data assembly is not shown for reasons of clarity. However, the bus controller does lower the RDY32 line to indicate to the master unit that the device is not ready to respond.

There are two exits from state 106, occurring depending upon the state of the RDY32 line. If the RDY32 line is low, either because the 32 bit device which is responding cannot respond in time or the system board has determined that a 32 bit board will not be responding and thus has lowered the RDY32 line, control proceeds to state 108 to enter a wait loop. Control proceeds from state 108 to state 110 where the state of the RDY32 line is again checked. If RDY32 is still low, control returns to state 108 to proceed and continue the wait loop. If the RDY32 line was high in state 106 or in state 110, control proceeds to state 112 to continue operation of the cycle.

In state 112, the master unit then asserts the next address on the LA lines and asserts the BURSTAV* signal as needed. The BURSTAV* signal is asserted when the master unit desires to do a burst operation, but only after a first standard cycle has been completed so that the row address in the memory devices is set. If the BURSTAV* signal is low or is set low in state 112 by the master unit and the BURST* signal is low indicating that the responding 32 bit device can perform a burst operation, then in state 112, the BE*<3-0> lines are asserted so that the full address is present on the bus. If the BURSTAV* signal is high indicating that the master unit does not wish to perform a burst operation or the BURST* signal is high indicating that the responding device cannot sustain a burst operation, control proceeds to state 102 and the normal memory cycle proceeds. As can be seen, a standard memory cycle is 4 BCLK signal edges or 2 full BCLK signal cycles in length.

However, if the BURSTAV* signal is low or has been set low in state 112 and the BURST* signal is low, thus indicating that a burst is desired and a burst can be performed, control proceeds to state 114 where, if this is a read operation, the data which is present on the bus is stored by the master unit and if this is a write operation, the data which is to be written is presented by the master unit. Burst operations to memory can be wait stated. Burst operation with one wait state is the same length as a normal memory cycle and therefore is not preferred but can be performed. If the RDY32 signal is low, control proceeds from state 114 to state 116 and to state 118. In state 118 the level of the RDY32 signal is checked and if it is still low, control returns to state 116. If the signal is high, then control returns to state 112 where the burst operation continues and the next addresses are started.

If the RDY32 signal was high prior to the next falling edge of the BCLK signal, then control proceeds from state 114 to state 112 where the next address is asserted. Thus it can be seen that in a normal burst operation, only one BCLK signal cycle is necessary to perform the burst operation, thus having a significantly higher data rate than the standard cycle and allowing very high data transfers to be performed. The master unit then proceeds in this state 112 to state 114 to state 112 loop until a burst operation is complete or must be exited, generally because the master unit must leave the burst mode because it has completed all the information which it needs to transfer or it must cross a page boundary and perform a full cycle to properly set up the row address register in the DRAM's.

The DMA controller state machine shown in FIGS. 7A and 7B is more complex than the master unit state machine because the DMA unit must provide signals which control both the responding memory unit and the requesting DMA device. The state machine is started at state 200 after determining that the DAK* signal has gone low. At state 200 the address is asserted onto the LA and BE* lines and automatically transferred to the SA address lines. Additionally the M-IO signal is raised. The BURSTAV* signal may be made low at this time if desired but preferably is made low when the first cycle has been fully completed. The W-R line is made low if this is an operation which will transfer information from memory to the DMA device and is made high if this is an operation which will transfer information from the DMA device to the memory.

Control then proceeds to state 202 and to state 204 on respective BCLK signal edges. At state 204, the IORC* signal is made low if this is a memory write operation and in either case the data is presented onto the data bus by the appropriate device, be it the memory device or the DMA device. Proceeding to state 206 on the next edge of the BCLK signal, the START* signal is made low, the RDY32 signal is made low and the state of the BURST* signal is latched for later branching. The START* signal is not made low at the same time as the address is asserted because, during a DMA operation, the SA and LA lines must both be stable for operation should a non-32 bit device respond. Again, that type of device will not be discussed in the state machine because burst cycles operate only in the 32 bit mode in the preferred embodiment.

Control then proceeds to state 208 and to state 210. At state 210 the status of the MEM32* and M16* signals are latched for later operation, the RDY32 line is floated so that the responding device can control the line, the START* signal is made high, the CMD* signal is made low and the IOWC* signal is made low if this is a memory read operation. There are two exits from state 210. The first exit is taken if the MEM32* signal is high indicating that a 32 bit device will not be responding to the requested transfer. As previously discussed, this case is handled by the bus controller located on the system board and the operation is not provided here for clarity.

Assuming that the MEM32* signal is low, control proceeds from state 210 to state 212. A number of operations may occur in state 212. One operation which does occur in any case in state 212 is that the RDY32 signal is latched for later branching on exit of this state. The first optional action which can occur at state 212 is that if the RDY32 signal is high and the DMA transfer is done as indicated for example by the DREQ signal being low or the terminal count signal indicating that this is the last operation, then the DMA controller floats the LA lines and the BURSTAV* line, allowing it to go high and raises the IORC* line to indicate completion of the cycle. If, however, the DMA operation is not completed, then if the RDY32 line is high and either the BURST* signal or the BURSTAV* signal is high, indicating that a burst operation cannot be maintained, then the IORC* signal is made high to begin terminating the data presentation by the DMA device and the LA lines are floated. If, however, the BURSTAV* signal is low and the BURST* signal is low and this is not the final operation of a DMA transfer, then in state 212, the next address is asserted on the LA and BE* lines, transferred to the SA lines and the BURSTAV* signal is lowered if this is the first short burst cycle of a burst operation, kept at a low condition if a burst operation is continuing or raised if a short burst cycle is not to be performed.

There are three exits from state 212. The first of concern is if the RDY32 signal is low, indicating that the responding device is not yet read. In this instance, control proceeds from state 212 to state 214 to state 216. In state 216, the RDY32 line state is again latched and two optional operations can occur. If the RDY32 line is high and if this is the final operation of the DMA transfer then once again the LA lines are floated, the BURSTAV* line is allowed to float and the IORC* signal is made high. If the DMA operation is not completed, if RDY32 is high and if either the BURST* or the BURSTAV* signals are high, indicating that a DMA operation cannot occur, then the LA lines are again floated and the IORC* signal is made high.

There are also 3 exists from state 216. If the RDY32 signal is still low, control returns to state 214. The other two exits from states 212 and 216 are to either states 218 or 220. Control proceeds to state 218 if the DMA operation was not completed. the RDY32 signal is high, the BURST* signal was low and the BURSTAV* signal is low, indicating that this is a burst operation and that it is being fully performed. Thus in state 218, the data is changed by the appropriate device and latched by the appropriate device. Control then proceeds from state 218 back to state 212 so that a one BCLK signal cycle data transfer rate occurs during burst operations in the DMA cycles.

If control did not proceed to state 218 from states 212 or 216, and the RDY32 signal was high, then control proceeds to state 220 which indicates generally that either the RDY32 signal was high and the DMA operation was done or that the RDY32 signal was high, that the DMA operation was not completed and that a burst operation could not be performed because the BURST* signal is high or the BURSTAV* signal is high. In that case, in state 220 the data is removed from the data line and thus it should be latched by the appropriate device. The latching is indicated by the CMD* signal going high or the IOWC* signal going high if this is a memory read operation. If the DONE signal is high indicating that the DMA operation is completed, the DAK* signal is made high to inform the DMA device that the termination is approaching If the DMA operation is not completed, control proceeds from state 220 to state 200 where the next cycle initiates. If, however, the DMA operation is completed, control proceeds to state 222 where the BE*<3-0> signals, the W-R line, the M-IO line, the CMD* and START* lines are all floated to allow proper transfer of the bus to the next controller.

Thus it could be seen that a conventional DMA transfer to a 32 bit memory requires four full BCLK cycles while a burst operation requires only one full BCLK cycle, thus allowing a significantly higher data rate in this particular instance.

Returning now to cycles A, B, C and D of FIG. 2, operation of the master unit state machine will be illustrated in combination with the timing diagram of FIG. 2. At time 300, the beginning of cycle A, the master unit state machine is at state 100 where the address is asserted and the M-IO line is made high. Control then proceeds at time 302 to state 102 where the data from the previous cycle is latched if it was a read operation, the BE*<3-0> lines are asserted, the START* signal is made low, the CMD* signal is made high and, in this particular instance, the W-R signal is made low. Control then proceeds to state 104 at time 304 and to state 106 at time 306. At this time the START* signal is made high and the CMD* signal is made low to indicate the transfer between operations.

Prior to the next falling edge of the BCLK signal at time 308 the RDY32 signal is made low so at time 308, control of the state machine proceeds to state 108. At time 310, control proceeds to state 110 and then, prior to time 312, the memory device raises the RDY32 signal so that at time 312 control proceeds to state 112. At state 112 the next address is asserted and in this instance the BURSTAV* signal is made low because a burst operation is desired. Control then proceeds to state 114 at time 314 because the BURSTAV* signal is low and the BURST* signal is low. Thus, in state 114, the data which has been presented by the memory is stored by the master unit. The RDY32 signal is high and therefore control returns to state 112 at time 316, where the next address is asserted and the BURSTAV* signal remains low. Control then proceeds to state 114 at time 318 and the next operation burst cycle, where once again the data is stored by the master unit and the memory proceeds to begin presenting the next data to the data lines. At time 320, control proceeds to state 112. At this time at state 112, the next address is still asserted but the BURSTAV* signal is made high because this is assumed to be crossing a page boundary and therefore a full address operation is necessary. Therefore control proceeds from state 112 to state 102 at time 322, where the START* signal is made low and the CMD* signal is made high, the W-R signal is made low, the BE*<3-0> lines are asserted and the data which is presented by the memory is latched and stored into the master unit. Control then proceeds to state 104 in this cycle D as previously discussed in cycle A and operation continues.

Thus it can be seen that the present invention provides for a computer system which has a very high data transfer rate under certain modes, significantly higher than the standard rates for either master unit memory operations or DMA operations.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

I claim:

1. A method of transferring data between a memory and a circuit board in a computer system at a first standard transfer rate and a second standard transfer rate, the computer system including a system board having a plurality of locations for inclusion of interchangeable circuit boards, the circuit board locations being interconnected by a series lines on the system board forming data, address and control busses, the data lines forming a plurality of different data widths, with the memory connected to the system board and with the data, address and control lines being coupled to the memory, the computer system further including a means for providing a synchronizing signal, with the synchronizing signal being provided to each location, the method comprising:

transferring data of a given maximum width between the memory and an interchangeable circuit board in a circuit board location at the first standard transfer rate and sequence defining a cycle, wherein first address values are provided by the circuit board on a first given direction edge of the synchronizing signal and the first address values are removed by the circuit board on said same synchronizing signal direction edge following at least two synchronizing signal cycles, with the first data values being provided after the providing of the first address values and being removed at approximately the opposite direction edge of the synchronizing signal following the removal of the first address values;

the circuit board indicating that transfer according to the second standard transfer rate and sequence is desired prior to or contemporaneous with commencing the second standard transfer rate transfers; and transferring data of the same given maximum width between the memory and the circuit board at the second standard transfer rate and sequence defining a cycle after completion of a cycle at the first standard transfer rate and sequence or a cycle at the second standard transfer rate and sequence, said address values for said second standard transfer rate cycle being within a defined range of the first address value of said first standard transfer rate cycle, wherein the address values are provided by the circuit board for a single synchronizing signal cycle, said address values changing on the same direction edge as the providing of the first address value of the first standard transfer rate cycle, with the data values being removed at approximately the opposite direction edge of the synchronizing signal following a full synchronizing signal cycle after the providing of the second address values.

2. A method of transferring data between a memory and a circuit board in a computer system at a first standard transfer rate and a second transfer rate, the computer system including a system board having a plurality of locations for inclusion of interchangeable circuit boards, the circuit board locations being interconnected by a series of lines on the system board forming data, address and control busses, the data lines forming a plurality of different data widths, with the memory connected to the system board and with the data, address and control lines being coupled to the memory and including a means for providing a signal to the control bus indicating that the second standard transfer rate may be utilized, the computer system further including a means for providing a synchronizing signal, with the synchronizing signal being provided to each location, the method comprising:

transferring data of a given maximum width between the memory and an interchangeable circuit board in a circuit board location at the first standard transfer rate and sequence defining a cycle, wherein first address values are provided by the circuit board on a first given direction edge of the synchronizing signal and the first address values are removed by the circuit board on said same synchronizing signal direction edge following at least two synchronizing signal cycles, with the first data values being provided after the providing of the first address values and being removed at approximately the opposite direction edge of the synchronizing signal following the removal of the first address values;

the memory indicating that the second standard transfer rate may be utilized after receiving said first address value; and transferring data of the same given maximum width between the memory and the circuit board at the second standard transfer rate and sequence defining a cycle after completion of a cycle at the first standard transfer rate and sequence or a cycle at the second standard transfer rate and sequence and after the memory indicates that the second standard transfer rate may be utilized, said address values for said second standard transfer rate cycle being within a defined range of the first address value of said first standard transfer rate cycle, wherein the address values are provided by the circuit board for a signal synchronizing signal cycle, said address values changing on the same direction edge as the providing of the first address value of the first standard transfer rate cycle, with the data values being removed at approximately the opposite direction edge of the synchronizing signal following a full synchronizing signal cycle after the providing of the second address value.

3. The method of claim 2, further comprising:
the circuit board indicating that transfer according to the second standard transfer rate and sequence is desired prior to or contemporaneous with commencing the second standard transfer rate transfers.

4. The methods of claims 1, 2 or 3, further comprising:
the memory indicating that either the first or second standard transfer rate is too great for data transfer and wherein the first or second standard transfer rate is reduced and portions of said first or second standard transfer sequence are delayed upon indication that the first or second standard transfer rate is too great.

5. The methods of claims 1, 2 or 3, further comprising:
performing a data transfer according to the first standard transfer rate and sequence after a data transfer according to the second standard transfer rate and sequence when the address value of the next data transfer is outside of said defined range.

6. The methods of claims 1, 2 or 3, wherein the memory includes page mode dynamic random access memories and said defined range for second standard transfer rate and sequence operation is the size of a page of the dynamic random access memories.

7. The methods of claim 1, further comprising:
providing a signal on said control lines during a first standard transfer rate cycle indicating start of a transfer cycle;
removing said start indication signal and contemporaneously providing a signal on said control lines during the first standard transfer rate cycle indicating continuation of the transfer cycle;
maintaining the states of said start indication signal and said continuation indication signal during second standard transfer rate cycle; and
removing said continuation indication signal at the completion of the second standard transfer rate cycles.

8. The methods of claim 7, further comprising:
removing said continuation indication signal at the completion of a first standard transfer rate cycle not followed by a second standard transfer rate cycle.

9. The methods of claim 7, wherein said start indication signal is provided on the next edge of said synchronization signal after providing of the address values, said start indication signal is removed and said continuation indication signal is provided on the same synchronization signal edge following one synchronizing signal cycle, and said continuation indication signal is removed on the same synchronization signal edge following at least one synchronizing signal cycle.

10. A method of transferring data between a memory and a circuit board in a computer system at a first standard transfer rate and a second standard transfer rate, the computer system including a direct memory access controller and a system board having a plurality of locations for inclusion of interchangeable circuit boards, the circuit boards including circuit boards utilizing direct memory access operation to transfer data between the circuit board operating in input/output space and the memory, the circuit board locations being interconnected by a series of lines on the system board forming data, address and control busses, the data lines forming a plurality of different data widths, with the memory and the direct memory access controller connected to the system board and with the data, address and control lines being coupled to the memory and the direct memory access controller, the computer system further including a means for providing a synchronizing signal, with the synchronizing signal being provided to each location, the method comprising:

transferring data of a given maximum width between the memory and an input/output space location in an interchangeable circuit board in a circuit board location at the first standard transfer rate and sequence defining a cycle, wherein first address values are provided by the direct memory access controller on a first given direction edge of the synchronizing signal and the first address values are removed by the direct memory access controller on said same synchronizing signal direction edge following at least two synchronizing signal cycles, with the first data values and being removed at approximately the opposite direction edge of the synchronizing signal following the removal of the first address values;

the direct memory access controller indicating that transfer according to the second standard transfer rate and sequence is desired prior to or contemporaneous with commencing said second standard transfer rate transfers; and transferring data of the same given maximum width between the memory and an input/output space location in the circuit board at the second standard transfer rate and sequence defining a cycle after completion of a cycle at the first standard transfer rate and sequence or a cycle at the second standard transfer rate cycle being with a defined range of the first address value of said first standard transfer rate cycle, wherein the address values are provided by the direct memory access controller for a single synchronizing signal cycle, said address values changing on the same direction edge as the providing of the first address value of the first standard transfer rate cycle, with the data values being removed at approximately the opposite direction edge of the synchronizing signal following a full synchronizing signal cycle after the providing of the second address value.

11. A method of transferring data between a memory and a circuit board in a computer system at a first standard transfer rate and a second standard transfer rate, the computer system including a direct memory access controller and a system board having a plurality of locations for inclusion of interchangeable circuit boards, the circuit boards including circuit boards utilizing direct memory access operation to transfer data between the circuit board operating in input/output space and the memory, the circuit board locations being interconnected by a series of lines on the system board forming data, address and control busses, the data lines forming a plurality of different data widths, with the memory and the direct memory access controller connected to the system board and with the data, address and control lines being coupled to the memory and the direct memory access controller, the memory including a means for providing a signal to the controller lines indicating that the second standard transfer rate may be utilized, the computer system further including a means for providing a synchronizing signal, with the synchronizing signal being provided to each location, the method comprising:

transferring data of a given maximum width between the memory and an input/output space location in an interchangeable circuit board in a circuit board location at the first standard transfer rate and sequence defining a cycle, wherein first address values are provided by the direct memory access controller on a first given direction edge of the synchronizing signal and the first address values are removed by the direct memory access controller on said same synchronizing signal direction edge following at least two synchronizing signal cycles, with the first data values and being removed at approximately the opposite direction edge of the synchronizing signal following the removal of the first address values;

the memory indicating that the second standard transfer rate may be utilized after receiving said first address values; and transferring data of the same given maximum width between the memory and an input/output space location in the circuit board at the second standard transfer rate and sequence defining a cycle after completion of a cycle at the first standard transfer rate and sequence or a cycle at the second standard transfer rate cycle being with a defined range of the first address value of said first standard transfer rate cycle and after the memory indicates that the second standard transfer rate may be utilized, wherein the address values are provided by the direct memory access controller for a single synchronizing signal cycle, said address values changing on the same direction edge as the providing of the first address value of the first standard transfer rate cycle, with the data values being removed at approximately the opposite direction edge of the synchronizing signal following a full synchronizing signal cycle after the providing of the second address value.

12. The method of claim 11, further comprising:
the direct memory access controller indicating that transfer according to the second standard transfer rate and sequence is desired prior to or contemporaneous with commencing said second standard transfer rate transfers.

13. The methods of claims 10, 11 or 12, further comprising:
the memory indicating that either the first or second standard transfer rate is too great for data transfer and wherein the first or second standard transfer rate is reduced and portions of said first or second standard transfer sequence are delayed upon indication that the first or second standard transfer rate is too great.

14. The methods of claims 10, 11 or 12, further comprising:
performing a data transfer according to the first standard transfer rate and sequence after a data transfer according to the second standard transfer rate and sequence when the address value of the next data transfer is outside of said defined range.

15. The methods of claims 10, 11 or 12, wherein the memory includes page mode dynamic random access memories and said defined range for second standard transfer rate and sequence operation is the size of a page of the dynamic random access memories.

16. The methods of claims 10, 11 or 23, further comprising:
providing a signal on said control lines during a first standard transfer rate cycle indicating start of a transfer cycle;
removing said start indication signal and contemporaneously providing a signal on said control lines during the first standard transfer rate cycle indicating continuation of the transfer cycle;
maintaining the states of said start indication signal and said continuation indication signal during second standard transfer rate cycles; and
removing said continuation indication signal at the completion of the second standard transfer rate cycles.

17. The methods of claim 16, further comprising:
removing said continuation indication signal at the completion of a first standard transfer rate cycle not followed by a second standard transfer rate cycle.

18. The methods of claim 16, wherein said start indication signal is provided on an opposite edge of said synchronization signal after providing of the address values, said start indication signal is removed and said continuation indication signal is provided on the same synchronization signal edge as the providing of said start indication signal following one synchronizing signal cycle, and said continuation indication signal is removed on the same synchronization signal edge as the providing of said continuation indication signal following at least one synchronizing signal cycle.

* * * * *

UNITED STATES PATENT AND TRADEMARK OFFICE
CERTIFICATE OF CORRECTION

PATENT NO. : 5,058,005
DATED : October 15, 1991
INVENTOR(S) : Paul R. Culley

It is certified that error appears in the above-identified patent and that said Letters Patent is hereby corrected as shown below:

In column 20, line 15, please delete "series lines" and insert --series of lines--.

In column 22, line 8, please delete "claim" and insert --claims-- and delete "1" and insert --1, 2, or 3--.

In column 23, line 43, please delete "controller lines" and insert --control lines--.

In column 24, line 46, please delete "or 23" and insert --or 12--.

Signed and Sealed this

Twenty-third Day of February, 1993

*Attest:*

STEPHEN G. KUNIN

*Attesting Officer*  Acting Commissioner of Patents and Trademarks